US012598161B2

(12) United States Patent
Pemmaraju et al.

(10) Patent No.: US 12,598,161 B2
(45) Date of Patent: Apr. 7, 2026

(54) EXTENDING A TRUST BOUNDARY BETWEEN CLOUD DOMAINS OF THE SAME ENTITY

(71) Applicant: Salesforce, Inc., San Francisco, CA (US)

(72) Inventors: Chaitanya Pemmaraju, Fremont, CA (US); Joshua Meier, El Dorado Hills, CA (US); Selim Ciraci, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 379 days.

(21) Appl. No.: 17/588,054

(22) Filed: Jan. 28, 2022

(65) Prior Publication Data

US 2023/0247006 A1     Aug. 3, 2023

(51) Int. Cl.
H04L 9/40 (2022.01)

(52) U.S. Cl.
CPC ........ *H04L 63/029* (2013.01); *H04L 63/0245* (2013.01); *H04L 63/0272* (2013.01); *H04L 63/0807* (2013.01); *H04L 63/0823* (2013.01); *H04L 63/166* (2013.01); *H04L 63/168* (2013.01); *H04L 63/20* (2013.01); *H04L 63/0263* (2013.01)

(58) Field of Classification Search
CPC ............... H04L 63/029; H04L 63/0245; H04L 63/0272; H04L 63/0807; H04L 63/0823; H04L 63/166; H04L 63/168; H04L 63/20; H04L 63/0263
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |

(Continued)

*Primary Examiner* — Cheng-Feng Huang
(74) *Attorney, Agent, or Firm* — Sterne, Kessler, Goldstein & Fox P.L.L.C.

(57) ABSTRACT

A network protocol and architecture for extending trust between cloud domains of a same entity comprises adding, by egress logic executing on a first server, authentication information to a packet leaving a first cloud domain of the entity to indicate a source of the packet. The egress logic allows the packet to traverse to a target cloud domain of the entity. Ingress logic executing on a second server at the target cloud domain intercepts the packet and performs validation of the authentication information. Responsive to the authentication information passing validation, the ingress logic determines that the first cloud domain is trusted and allows the packet to proceed to a destination. Responsive to the authentication information failing validation, the ingress logic rejects the packet.

21 Claims, 9 Drawing Sheets

100

(56)  References Cited

U.S. PATENT DOCUMENTS

| | | | |
|---|---|---|---|
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,069,231 | B1 | 6/2006 | Cinarkaya |
| 7,069,497 | B1 | 6/2006 | Desai |
| 7,100,111 | B2 | 8/2006 | McElfresh et al. |
| 7,181,758 | B1 | 2/2007 | Chan |
| 7,269,590 | B2 | 9/2007 | Hull et al. |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,508,789 | B2 | 3/2009 | Chan |
| 7,599,935 | B2 | 10/2009 | La Rotonda et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,779,039 | B2 | 8/2010 | Weissman et al. |
| 7,779,475 | B2 | 8/2010 | Jakobson et al. |
| 7,827,208 | B2 | 11/2010 | Bosworth et al. |
| 7,853,881 | B1 | 12/2010 | Aly Assal et al. |
| 7,945,653 | B2 | 5/2011 | Zukerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah |
| 8,209,308 | B2 | 6/2012 | Rueben et al. |
| 8,209,333 | B2 | 6/2012 | Hubbard et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 10,652,281 | B1 * | 5/2020 | Moolenaar ......... H04L 63/0236 |
| 11,108,938 | B2 | 8/2021 | Sugie |
| 11,277,303 | B1 | 3/2022 | Meier |
| 2001/0044791 | A1 | 11/2001 | Richter et al. |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |

(56)  References Cited

U.S. PATENT DOCUMENTS

| | | | |
|---|---|---|---|
| 2005/0188194 A1* | 8/2005 | Fascenda | H04W 12/069 |
| | | | 713/155 |
| 2007/0300290 A1* | 12/2007 | Shay | H04L 63/0428 |
| | | | 370/392 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2015/0270975 A1* | 9/2015 | Buckley | H04W 4/12 |
| | | | 713/176 |
| 2016/0173338 A1* | 6/2016 | Wolting | H04L 45/74 |
| | | | 709/223 |
| 2020/0045015 A1* | 2/2020 | Nukala | H04L 63/1416 |
| 2021/0112034 A1* | 4/2021 | Sundararajan | H04L 47/125 |
| 2021/0160237 A1* | 5/2021 | Rozner | H04L 9/3213 |
| 2021/0218712 A1* | 7/2021 | Zhao | H04L 63/0884 |

* cited by examiner

100

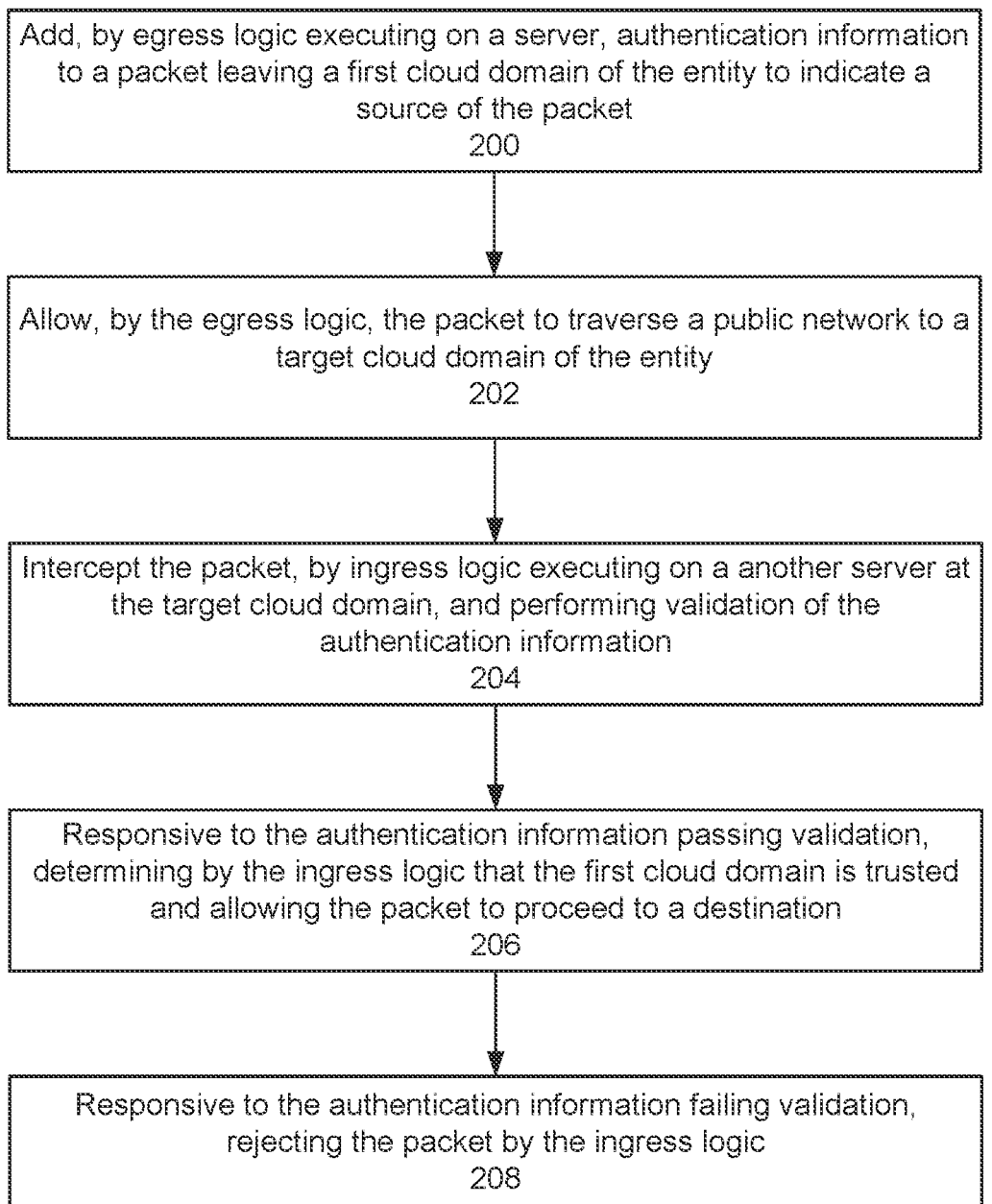

Add, by egress logic executing on a server, authentication information to a packet leaving a first cloud domain of the entity to indicate a source of the packet
200

Allow, by the egress logic, the packet to traverse a public network to a target cloud domain of the entity
202

Intercept the packet, by ingress logic executing on a another server at the target cloud domain, and performing validation of the authentication information
204

Responsive to the authentication information passing validation, determining by the ingress logic that the first cloud domain is trusted and allowing the packet to proceed to a destination
206

Responsive to the authentication information failing validation, rejecting the packet by the ingress logic
208

FIG. 2

Implementation I: Egress Logic

Implementation II: Egress Logic

Implementation II: Ingress Logic

EXTENDING A TRUST BOUNDARY BETWEEN CLOUD DOMAINS OF THE SAME ENTITY

TECHNICAL FIELD

One or more implementations relate to the field of network routing protocols; and more specifically, to extending a trust boundary between cloud domains of the same entity.

BACKGROUND ART

The advent of powerful servers, large-scale data storage and other information infrastructure has spurred the development of advanced data warehousing applications. For example, cloud computing uses a network of remote servers hosted on the Internet to store, manage, and process data, rather than a local server or a personal computer. To leverage the global infrastructure provided by cloud service providers (CSPs) and to expand software services into other geographies, entities such as business or enterprises are continuing to move software services from in-house systems to the public cloud. The software services are typically uploaded to a particular domain of the entity, which is a distinct subset of the Internet with IP addresses sharing a common suffix or under the control of a particular entity or individual. Sometimes the domains may be associated with specific business units of the enterprise.

During operation, a software service hosted by a domain of a particular business unit of the entity may need to communicate with another software service hosted by another domain of a different business unit, and the two domains may have different policies. When the two domains wish to communicate with each other, traffic in the form the communication packets may go through the public Internet or a trusted channel of the entity depending on how the services are deployed. At the destination domain, it is desirable to distinguish between the two different types of traffic, i.e., Internet traffic versus traffic from the same enterprise but from different domains or business units.

There are traditional solutions that attempt to solve this problem, but the solutions can be difficult to configure and manage. Examples of the traditional solutions include virtual private networks (VPNs) gateways and IPSec (Internet Protocol Security). VPNs enable users to connect to a remote private network through the Internet. A VPN gateway is a separate device, such as a router, server, or firewall that serves as a connection point between two LANs that are connected by a non-secure network such as the Internet. A VPN gateway requires internetworking and data transmission capabilities, is configured to pass, block or route VPN traffic, and provides core VPN-specific networking services such as IP address assignment and management, dynamic and static routing and the maintenance of routing tables.

There are typically two types of VPNs, IPSec and OpenSSL. IPSEC is a secure network protocol suite that defines encrypted, decrypted and authenticated packets of data as well, as secure key exchange and key management, to provide secure encrypted communication between two computers over an Internet Protocol network. While SSL-based VPNs have their own set of security mode features, IPSEC VPNs additionally provide robust means of ensuring the security of the data being transmitted, which is not available in SSL-based VPNs. IPSEC VPN provides multiple layers of security that ensure the security mode and integrity of the data that is being transmitted through the encrypted tunnel.

The use of VPNs and IPSec work for their intended purposes, but both solutions have drawbacks. For example, VPNs require significant overhead to set up and maintain. Some other disadvantages of using a VPN are: i) VPNs may slow connection speed; ii) a VPN user may be blocked from using certain services or websites; iii) VPNs are illegal or tightly controlled in certain countries, such as China; and iv) VPN users may experience disruptions in their network connection. IPSec uses digital certificates for tunnel authentication instead of pre-shared keys and is a popular way for network administrators to scale and configure a VPN using IPsec network. The certificates are used to authenticate the tunnels before the clients perform user authentication. To enable digital certificates in a network, a combination of operational mode commands and configuration statements are required, adding administrative complexity. Furthermore, IPSec uses certificates that have long expiry times (e.g., one year) and therefore have higher risk if lost/stolen. A lost certificate requires a process to revoke the certificate. The revocation process opens a window of time in which there is a security compromise.

What is needed, therefore, is a more adaptable, dynamic and secure network protocol and architecture for extending the trust boundary between cloud domains of the same entity.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2 illustrates a flow diagram for a process for extending a trust boundary between cloud domains of the same entity according to a first implementation.

DETAILED DESCRIPTION

The following description describes implementations for extending a trust boundary between cloud domains of the same entity. The disclosed implementations provide a network protocol and architecture that identifies incoming network traffic between different cloud domains of the same enterprise in order to treat this traffic differently versus other incoming (public) Internet traffic to the cloud. The traffic identified as being from domains of the same entity is automatically trusted without extensive configuration, thus enabling trust at scale.

Figure 1:
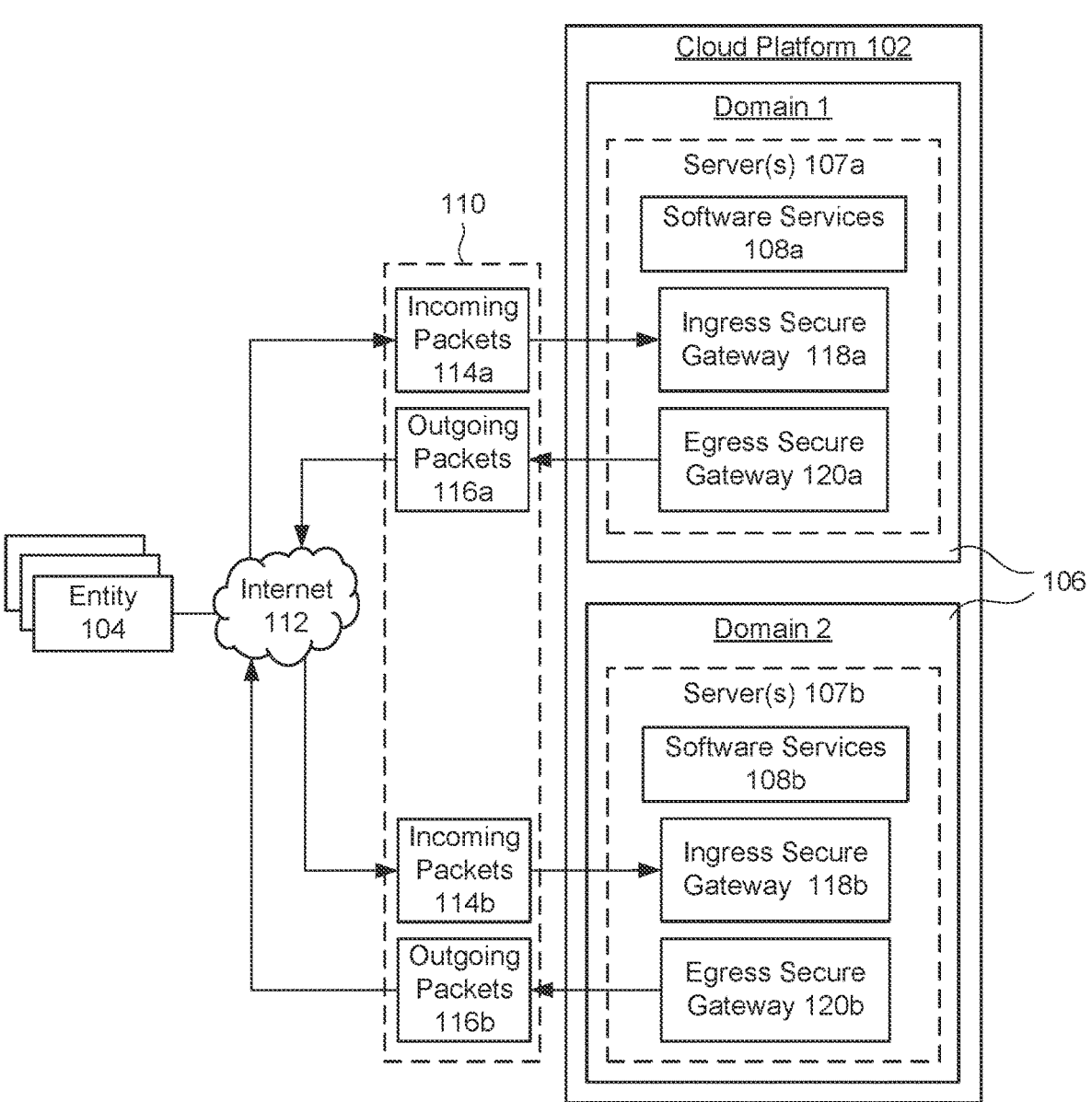
FIG. 1 illustrates a system for implementing a network protocol for extending a trust boundary between cloud domains of the same entity.

FIG. 1 illustrates a system for implementing a network protocol for extending a trust boundary between cloud domains of the same entity. The system 100 includes a cloud platform 102, which may be implemented as an Internet-based data center comprising software and hardware (e.g., servers) that co-exist at scale. According to the disclosed implementations, the cloud platform 102 may comprise a public cloud or a hybrid cloud. A public cloud is provided by a third-party cloud service provider that delivers computing resources over the Internet. Example cloud service providers include Amazon Web Services (AWS), Google Cloud Platform, Alibaba, Microsoft Azure, and IBM Bluemix. A private cloud is a private cloud platform exclusive to a single entity 104, where an entity is typically a business, research organization or enterprise, but may also be an individual. A hybrid cloud is a combination of public and private cloud platforms, where the private cloud is usually in an on-site data center or hosted by a third-party service provider. Data and applications may move seamlessly between the public and private cloud platforms. A hybrid cloud gives the entity greater flexibility and helps optimize infrastructure, security, and compliance.

One or more entities 104 may access the cloud platform 102 to access compute services such as servers, databases, storage, analytics, networking, software and intelligence from the cloud platform 102. The cloud platform 102 may provide scalable computing capacity in the form of virtual private clouds (VPCs) in which entities 104 can launch as many or as few servers 107 as they need, configure security and networking, and manage storage. Virtual private clouds (VPCs), may include various configurations of CPU, memory, storage, and networking capacity for each entity's instances. An example of such an environment is Amazon Elastic Compute Cloud™ (Amazon EC2), which provides scalable computing capacity in the AWS cloud.

To leverage the global infrastructure provided by cloud service providers and to expand software services into other geographies, entities 104 are continuing to move software services 108a and 108b (collectively referred to as software services 108) from in-house systems to the cloud. In this example, software services 108a of the entity 104 are uploaded to cloud domain 1 and software services 108b of the entity 104 are uploaded to domain 2, and so on within the cloud platform 102. As used herein, a cloud domain is a distinct subset of the internet with IP addresses sharing a common suffix (e.g., a name of the entity "salesforce") or under the control of a particular entity. In the example, shown, respective cloud domains 106 may include a set of one or more servers 107a and 107b that execute the software services 108 therein. Sometimes, respective domains 106 may be associated with specific business units or projects of the entity 104.

During operation, a software service 108 hosted by a cloud domain 106 of a particular business unit of the entity 104 (e.g., Domain 1) may need to communicate with another software service hosted by another cloud domain 106 of a different business unit (e.g., Domain 2), and the two domains may have different communication policies. When the two cloud domains wish to communicate with each other, network traffic 110 ("traffic") in the form of communication packets comprising both incoming packets 114a and 114b and outgoing packets 116a and 116b may travel through the public Internet 112 and/or a trusted channel of the entity 104 depending on how the software services 108 are deployed. As used herein, the incoming packets 114a and 114b and outgoing packets 116a and 116b may be collectively referred to as incoming packets 114 and outgoing packets 116, respectfully.

More specifically, cloud domain (CD) communication paths can be broadly classified as: i) intra-CD communication, ii) inter-CD private link communication, and iii) CD to Public Endpoint communication. Intra-CD communication is the transfer of data packets from server to server (or service to service) within the cloud platform (or VPC). This traffic does not necessarily involve communicating with a public endpoint. All the traffic among the services within a CD 106 will be routed through transit gateways and governed by policies defined through security groups.

Inter-CD private link communication pertains to when a service 108 within a CD needs to communicate with the private IP space of another infrastructure of the entity 104. This traffic pattern is discouraged but might still continue to exist. Cloud native solutions may govern the access policies for this case.

CD to Public Endpoint communication pertains to the traffic between a service 108 within a CD and an external endpoint in the public IP space. The external endpoint can be controlled by a party other than the entity 104 on the internet (e.g., 3rd party integrations) as well as public endpoint of the entity 104 (e.g., gus/org62, public endpoint of another CD). A public proxy may be responsible for enforcing access controls for this communication path.

At the destination domain, it is desirable to distinguish between the two different types of packets, i.e., packets sent between different cloud domains 106 of the same entity 104 versus other packets from the public Internet incoming to the cloud platform 102, without first requiring extensive configuration by network administrators. Extensive configuration in the absence of a trust boundary may refer to the need to enforce explicit controls at the ingress to create/maintain an allowlist or whitelist of individual IP addresses of the other CDs that are trying to communicate with the CD in question. This can be a long growing list, cumbersome to maintain and prone to error, with potential for missing entries or stale entries.

According to the disclosed implementations, when the system 100 receives incoming traffic 114, the system 100 identifies and distinguishes packets sent over the Internet between different cloud domains 106 of the same entity 104 versus other packets from the public Internet incoming to the cloud platform 102, and treats the packets between the cloud domains 106 of the same entity 104 differently. In particular, the disclosed implementations provide the cloud domains 106 with an ingress secure gateway 114 and an egress secure gateway 116. In the example shown, domains 1 and 2 are provided with ingress secure gateways 118a and 118b (collectively referred to as ingress secure gateways 118), and egress secure gateways 120a and 120b (collectively referred to as egress secure gateways 120).

The egress secure gateways 120 include egress logic that adds authentication information to a packet leaving a cloud domain 106 of the entity 104 to indicate the source of the packet using an implicit certificate or an explicit token. As referred to herein, an implicit certificate can be short lived certificates and/or tokens, so even in the case of potential lost/stolen certificate/token, the window in which the certificate/token is valid would be quite small (e.g., minutes or hours up to a few days). After the authentication information is added, the packet is allowed to traverse the public Internet 112 to a target cloud domain. At the target cloud domain of the same entity 104, the ingress security gateways 118 include ingress logic that intercepts the packet and performs a validation of the authentication information. If the authentication information passes validation, then the source of the packet is trusted and the packet is allowed to proceed to the destination. Otherwise, the packet is rejected and discarded.

As illustrated, each domain 106 and/or private network, has several exemplary components including a plurality of servers 107 (and storage devices), software services 108, ingress and egress gateways 118 and 120, and any technology on which other technologies are built in multicloud and hybrid cloud environments. It will be appreciated there may be fewer or more components, and in particular illustrated items may represent a high level abstraction of multiple underlying hardware and/or software features or functionality to be accessed to perform operations as described herein.

FIG. 2 illustrates a flow diagram for a process for extending a trust boundary between cloud domains of the same entity according to a first implementation. Referring to both FIGS. 1 and 2, the process may include adding, by egress logic executing on a server, authentication information to a packet leaving a first cloud domain of the entity 104 to indicate a source of the packet (block 200).

In one implementation, the authentication information may be implemented as an implicit certificate or an explicit token, as described further below. In one implementation, rather than indicating the source of the packet using an IP address, the system 100 utilizes an identity-based policy whereby an identifier (e.g., a name) of the entity or the cloud domain 106 is associated with the authentication information to identify the source the packet.

The process further includes the egress logic allowing the packet to traverse a public network to a target cloud domain of the entity 104 (block 202). In one implementation, the egress logic may be part of the egress secure gateways 120 and may be executed by the servers 107 of the corresponding cloud domain or another server.

Ingress logic executing on another server at the target cloud domain intercepts the packet and performs validation of the authentication information (block 204). Responsive to the authentication information passing validation, the ingress logic determines that the first cloud domain is trusted and allows the packet to proceed to a destination (block 206). By examining the authentication information, which identifies the source or origin of the packet, the second server at the target domain is able to determine the packet has been sent between the cloud domains 106 of the same entity 104 and therefore, automatically trusts the packet. On the other hand, responsive to the authentication information failing validation, the ingress logic rejects the packet (block 208).

According to the disclosed implementations, a network protocol and architecture are provided for extending a trust boundary between cloud domains of the same entity that provides several advantages. One advantage is that the disclosed implementations address scalability concerns by moving away from IP-based N/S policy enforcement to identity-based policies. The disclosed implementations also enforces the identity-based policy on intra-CD traffic only.

It will be appreciated various combinations of gateways, routers, VPN and or other communication apparatus may be used to securely connect the entity 104 (e.g., via a data center) with the cloud platform 102. In particular it will be appreciated there may be multiple gateways, routers, VPNs, etc. to securely connect a data center (not shown) of the entity 104 to the cloud platform 102, and for the cloud platform 102 to physically and/or logically partition hosted databases, database collectives, machines, etc. into multiple domains 106 and/or private networks. It will be appreciated that the cloud platform 102 may include many cloud domains/private networks/subnets. Further, some of the ingress secure gateways and egress secure gateways of the entity 104 need not be hosted in the cloud platform 102 or made available through a cloud service. The embodiments disclosed herein are cloud/vendor agnostic and may be implemented for and/or within any public or private hosting environment.

FIGS. 3A-3B and 4A-4B illustrate flow diagrams describing the ingress and egress logic performed by two different implementations for extending the trust boundary between cloud domains of the same entity.

Figure 3A:
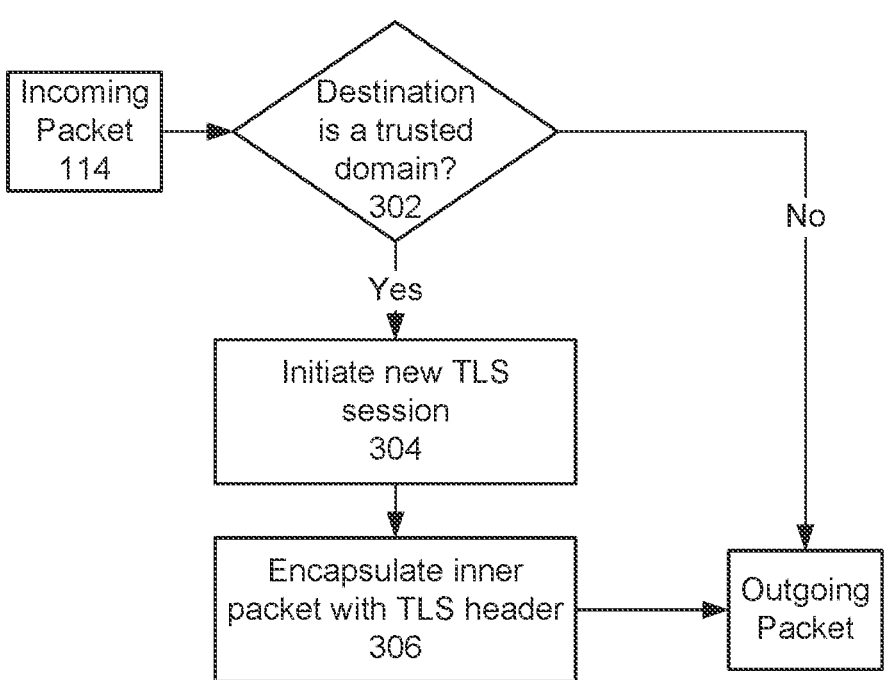
FIG. 3A illustrates a flow diagram of the processing performed by the egress logic according to the first implementation.
Figure 3B:
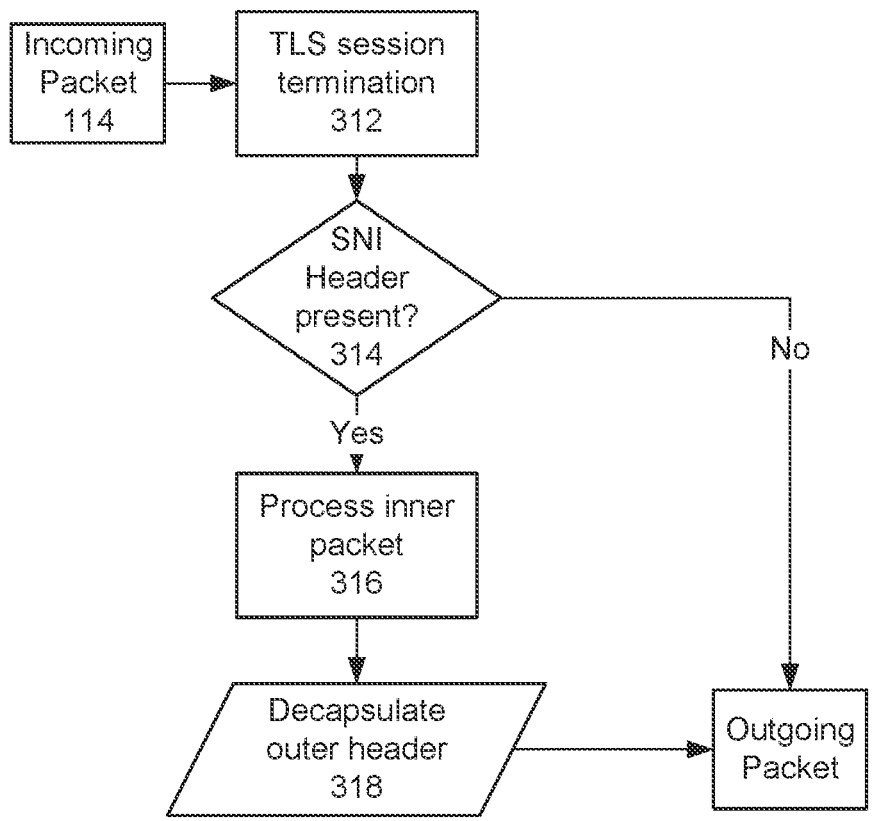
FIG. 3B illustrates a flow diagram of the processing performed by the ingress logic according to the first implementation.

FIGS. 3A-3B describe implementation 1, in which a Transport Layer Security (TLS) session tunnel for the packet is used as the authentication information. TLS is the successor of the now-deprecated Secure Sockets Layer (SSL), and is a cryptographic protocol designed to provide communications security over a computer network. The protocol is widely used in applications such as email, instant messaging, and voice over IP, and securing HTTPS. The TLS protocol aims primarily to provide privacy and data integrity between two or more communicating computer applications. As is well-known, the Open Systems Interconnection Model (OSI Model) partitions the flow of data in a communication system into seven abstraction layers: 1) physical layer, 2) data link layer, 3) network layer, 4) transport layer, 5) session layer, 6) presentation layer, and 7) application layer. TLS runs in the application layer and comprises a TLS record and TLS handshake protocols.

According to the disclosed embodiments, the first implementation uses an OSI layer 7 tunnel to set up an explicit TLS session tunnel and to leverage Server Name Indication (SNI). SNI is a header of TLS in which trusted information about the packet is placed as the authentication information. In conventional SNI implementations, a client may use the SNI to indicate which hostname the client is attempting to connect to at the start of a handshaking process.

The present disclosure extends this concept to inter-CD traffic and is used to verify the source cloud domain, server of the source cloud domain, or the entity itself (e.g., "salesforce"). The cloud domain's servers 107 have access to such identifying information for the servers 107 and cloud domains 106 of the entity 104, and a TLS session is set up between the sending and the receiving server. This is analogous to communication between a user computer and a website, but the present implementation is using the method between cloud domains. Because of the tunnel, as the packets travel reach the destination, the destination server has to validate the packet to determine the source of the packet. Setting up an additional TLS session provides the flexibility to add metadata to the TLS session, such as inserting an identifier (ID) of the source cloud domain and/or the entity in accordance with the present disclosure. The identifying information can be inserted as plain text or encoded. When the receiver on the other end examines the ID in the packets, the receiver determines the sender and receiver are from the same entity when their IDs match, and terminates the TLS session.

Referring to FIG. 3A, a flow diagram of the processing performed by the egress logic according to the first implementation is shown. At the originating or sending server, the egress logic receives an incoming packet 114 and determines whether the destination of the packet is a trusted server or cloud domain by examining the SNI header for an identifier of a trusted server or domain name, e.g., "*.salesforce.com" (block 302). If not, the packet 114 is forwarded to the destination without modification. If the SNI header does contain an identifier of a trusted server or cloud domain, the egress logic initiates a new TLS session between the sending server and the receiving server (block 304). The inner portion of the packet is then encapsulated with a TLS header to verify the source (block 314). For example, a signature SNI domain name is placed in the TLS header, where the SNI domain name may comprise a cookie or a numeric or alphanumeric signature string. The packet is then allowed to traverse to the destination.

Referring to FIG. 3B, a flow diagram of the processing performed by the ingress logic according to the first implementation is shown. At the destination or receiving server, the ingress logic receives an incoming packet 114 and terminates the existing TLS session (block 312). The SNI header is parsed to determine if the SNI header contains an identifier of a trusted entity, cloud domain or server (block 314). This validation of the identifier could happen with encoding decoding logic that could be shared over the control plane between both cloud domains so that the identifier of the trusted entity would be encoded/decoded so that the identifier is unique and map to the incoming CD when decoded. In some implementations, there may be a time encoded into identifier so that even if the identifier is stolen, the identifier become obsolete in a short time.

If it is determined that the SNI header does not contain an identifier of a trusted cloud domain (block 314), the inner packet is forwarded to the destination software service 108 without modification. If the SNI header does contain an identifier a trusted cloud domain, the packet is processed (block 316), the outer header is the decapsulated (block 308), and the inner packet is forwarded to a destination software service 108.

According to the first implementation, a known TLS tunneling mechanism is used rather than a proprietary protocol tunneling mechanism. This makes the mechanism simpler to design and easier to implement. In addition, it is easy to distinguish intra-CD traffic from internet traffic in the ingress direction.

Figure 4A:
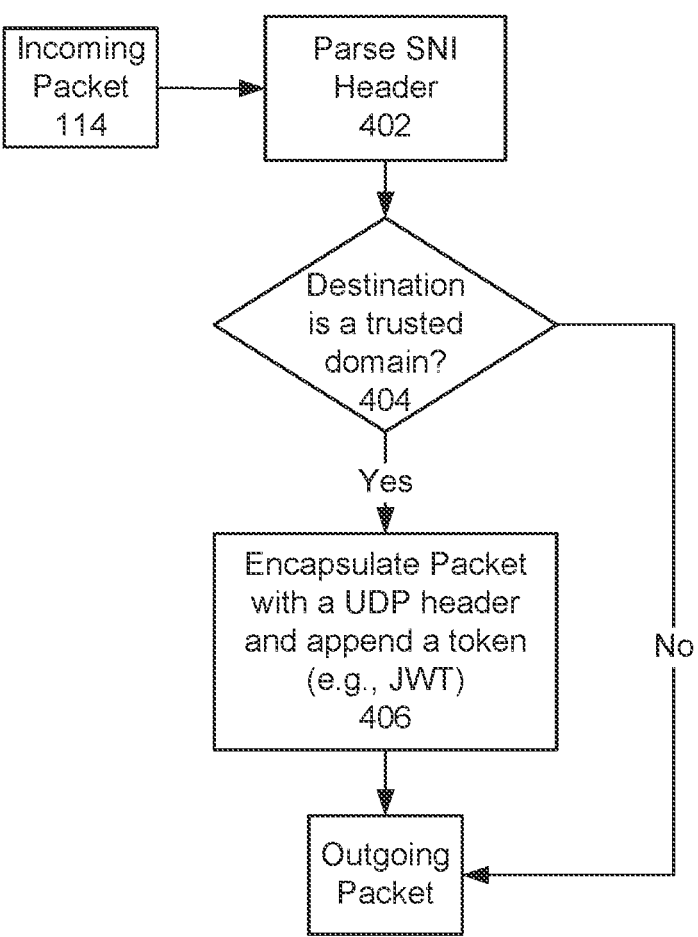
FIG. 4A illustrates a flow diagram of the processing performed by the egress logic according to the second implementation.
Figure 4B:
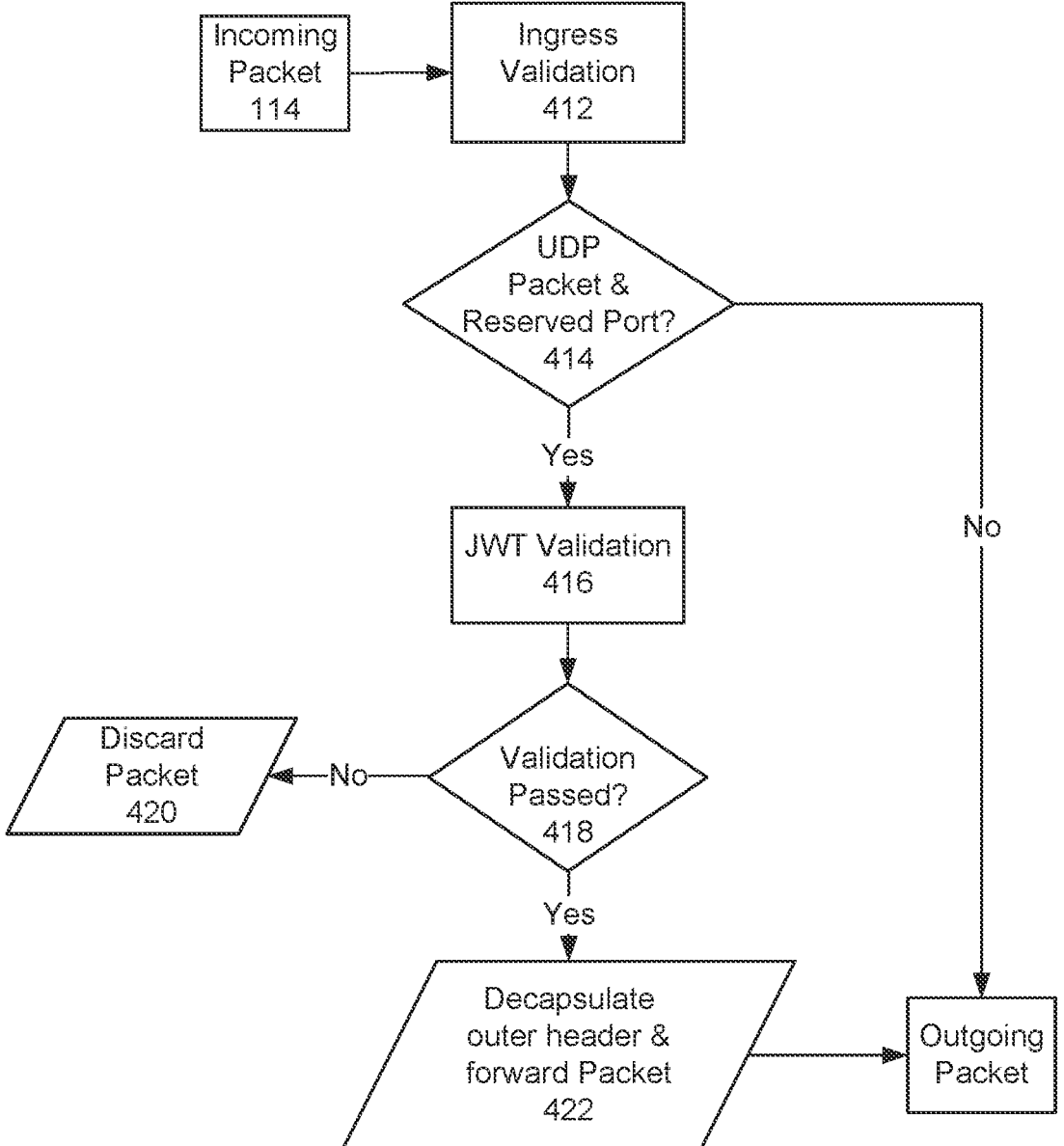
FIG. 4B illustrates a flow diagram of the processing performed by the ingress logic according to the second implementation.

FIGS. 4A-4B describe the second implementation in which packets are encapsulated with a User Datagram Protocol (UDP) header and a JSON Web Token (JWT) as the authentication information. A JWT is a proposed Internet standard for creating data with an optional signature and/or with optional encryption whose payload holds JSON that asserts some number of claims. The tokens may be signed either using a private secret or a public/private key. UDP is a communications protocol that is primarily used to establish low-latency and loss-tolerating connections between applications on the internet using IP addresses. With UDP, computer applications can send messages, in this case referred to as datagrams, to other hosts on an Internet Protocol (IP) network. Prior communications are not required in order to set up communication channels or data paths. UDP has no handshaking dialogues, and there is no communication in the event a packet is not received.

According to the second implementation, a TCP packet to be sent to from one domain to another is packaged in a UDP payload (a UDP header and an additional JSON web token identifying the source) and sent. Typically, JWT is usually used at the OSI layer 7 application level. However, the second implementation of present disclosure leverages JWT at the OSI layer 3 network level, where JWT is inserted into a UDP tunnel packet. Thus, the UDP packet contains the original TCP packet. Even if the packet drops during transmission, TCP can be used to make sure the packet is resent. The recipient receives the packet and determines if the sender is trusted by validating the token. The header is then stripped and the packet is forwarded to the destination software service in the target cloud domain. This provides an efficient transmit where there is no a connection overhead to determine whether the packet is received or not. Instead, a UDP header is simply added to the packet, and on the receiving end, only the token appended to the UDP header needs to be validated and then discarded. One advantage is that the overhead in issuing a JWT token is much lower than issuing a certificate. In addition, the send and forget transmission of a packet using UDP dispenses with the overhead of determining if the recipient received the packet. UDP is also a faster medium of communication and that occurs at the OSI layer 3 network level and layer 4 transport level.

Referring to FIG. 4A, a flow diagram of the processing performed by the egress logic according to the second implementation is shown. Egress logic at the sender processes packets by parsing the SNI header of the packet 114 (block 402), and determines if the server/domain identifier in the SNI header is from a trusted domain, i.e., from the same entity, meaning internal traffic (intra-CD) (block 404). If the SNI header indicates a trusted source, the payload of the packet is encapsulated with a UDP header with a reserved port, and a frequently refreshed token, such as a JWT (JSON web token), is appended to the packet (block 406). More specifically, the egress logic copies the source IP/port and destination IP/port from inner header to outer IP and UDP headers, uses a specific destination port to identify the proprietary implementation, appends JWT to the inner IP/TCP packet and sends out the combined payload as a UDP packet. If it is determined in block 404 that the SNI header is not from a trusted domain, the packet is transmitted without modification.

Referring to FIG. 4B, a flow diagram of the processing performed by the ingress logic according to the second implementation is shown. At the destination or receiving server, a network load balancer may perform ingress validation by receiving and determining the packet comprises UDP traffic with a reserved port, and routs to the ingress secure gateway 118 (block 412). Any remaining traffic may be routed to a standard ingress gateway. The ingress logic of the ingress secure gateway 118 receives an incoming packet 114, decapsulates IP and UDP header (block 414), and attempts to validate the JWT, e.g., by using a key (block 418). If the JWT validation fails, the packet is rejected/discarded (block 420). If the JWT is validated, the outer header of the packet is decapsulated and the packet is forwarded (block 422).

As described above, the packet may be intercepted at layer 3, and in some implementations, a Data Plane Development Kit (DPDK) may be used to perform the encapsulation and decapsulation to achieve lower latencies. DPDK is an open source software project that provides a set of data plane libraries and network interface controller polling-mode drivers for offloading TCP packet processing from the operating system kernel to processes running in user space libraries. Thus, use of DPDK bypasses the operating system kernel in ingress. The reason for using UDP tunneling over TCP is to avoid maintaining session and connection tracking. Although UDP is best effort delivery, the assumption is that inner packet TCP would recover from any potential packet loss.

Figure 5:
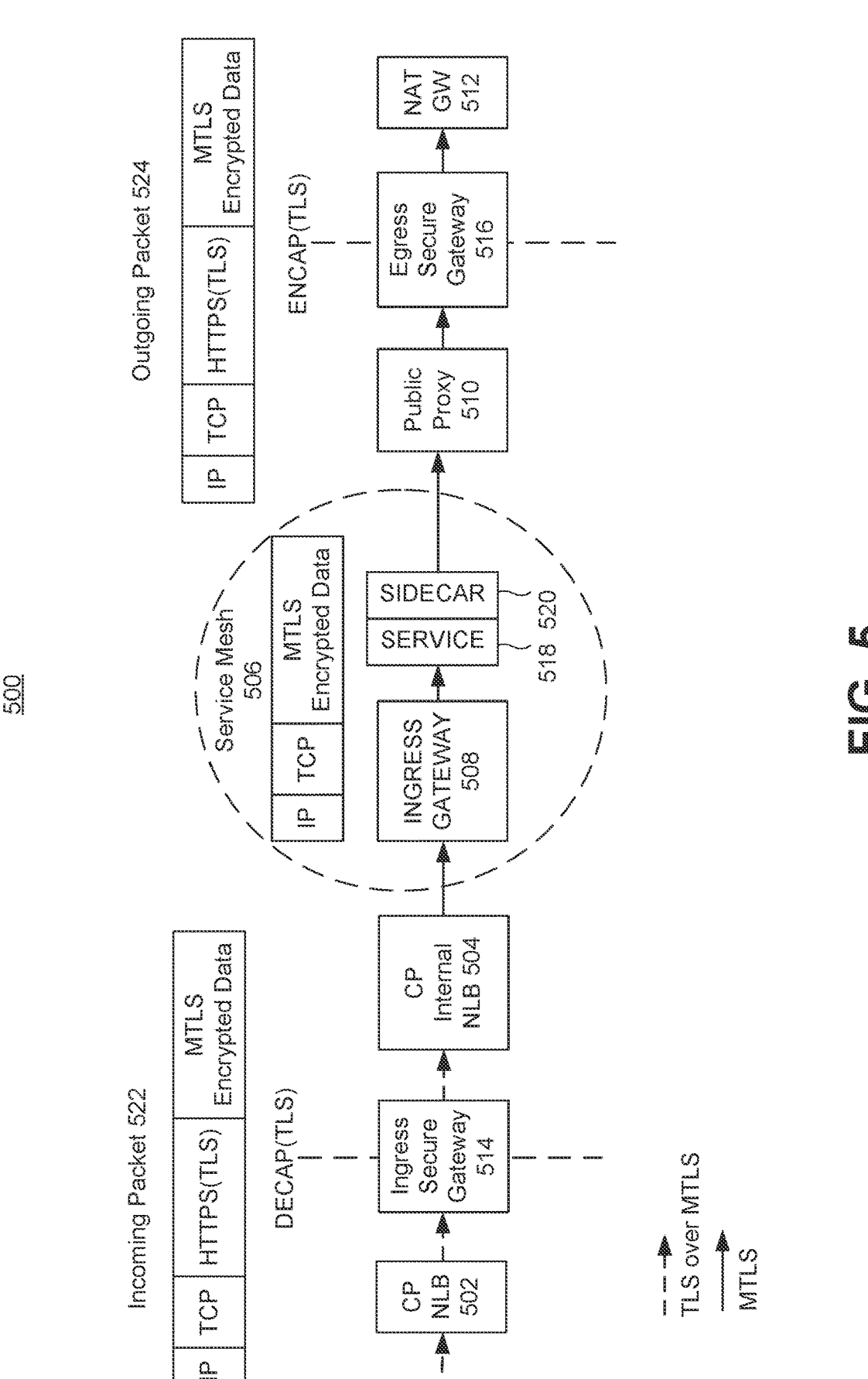
FIG. 5 illustrates an example system for extending the trust boundary between cloud domains of the same entity using a layer 7 TLS tunnel for inter-CD traffic according to the first implementation.

FIG. 5 illustrates an example system for extending the trust boundary between cloud domains of the same entity using a layer 7 TLS tunnel for intra-CD traffic according to the first implementation. The system includes a cloud provider (CPD) network load balancer (NLB) 502, a CP internal NLB 504, a service mesh 506 having an ingress gateway 508, a public proxy 510, and a network address translation (NAT) gateway 512.

The CP NLB 502 load balances traffic incoming to the cloud platform 102 and/or to a domain 106. The CP internal NLB 504 load balances traffic inside a virtual network. The service mesh 506 is an infrastructure layer for facilitating network-based service-to-service (inter-process) communications between services 518 or microservices, using a proxy or application programming interfaces (APIs). The service mesh 506 functions as a dedicated communication layer that automatically routs requests from one service to the another. The service mesh may also provide observability into communications, provide secure connections, and automating retries and backoff for failed requests, for instance. The ingress gateway 508 may be deployed as needed into any entity account that requires them for NLB return traffic outside of the cloud domain. The ingress gateway 508 is anchored externally by the CP NLB 502 to preserve the original client source address.

The service mesh 506 further comprises network proxies paired with each service 518 in an application and a set of task management processes. The proxies are called the data plane and the management processes are called the control plane. The data plane intercepts calls between different services and "processes" them; the control plane is the brain of the mesh that coordinates the behavior of proxies and provides APIs for operations and maintenance personnel to manipulate and observe the entire network. Sidecar proxies 520 are used to enhance network security, reliability, and observability. These functions are abstracted away from the application's primary container and implemented in a common out-of-process proxy (the sidecar), delivered as a separate container in the same pod.

The public proxy 510 is a forward proxy service in the entity's first-party data-centers that provides outbound access to all public domain names and IP addresses from the systems within the entity's data-centers. Direct access to the internet is forbidden for these internal systems. The public proxy 510 is a foundational services of each cloud domain 106 and resides in the cloud domains. Other services are able to access the public proxy 510 via the ingress gateway 508. The public proxy service has both private and public subnets. The public proxy hosts reside in the private subnets. The public proxy service has a route out to the internet through the NAT gateway 512 that are placed in the public subnet.

The NAT gateway 512 provides a network address translation (NAT) service so that instances in a private subnet can connect to services outside the entity's virtual private cloud (VPC) but external services cannot initiate a connection with those instances.

As the entity 104 transitions infrastructure to the public cloud, security measures provided by public proxy 510 are not available through cloud native solutions. In addition, the NAT gateway 512 can only filter by source address or traffic tag, and cannot filter allowed destinations.

According to the present implementations, the system 500 overcomes these drawbacks by providing an ingress secure gateway 514 between the CP NLB 502 and the CP internal NLB 504, and by providing an egress secure gateway 516 between the public proxy 510 and the NAT gateway 512.

In operation, an incoming packet 522 having an IP, TCP and HTTPS (TLS) headers along with the data in the form of mutual TLS (MTLS) encrypted data, is received by the ingress secure gateway 514 from the CP NLB 502. When the ingress secure gateway 514 receives the packet 522, the ingress logic of the ingress secure gateway 514 performs validation, as described in FIG. 3B, decapsulates the first three headers (IP, TCP and HTTPS(TLS)) and sends the MTLS encrypted data to the service mesh 506 through the CP internal NLB 504. Thus, the disclosed embodiments adds another layer before the internal CP internal NLB that decapsulates the headers.

The service mesh 506 processes the MTLS data and sends the MTLS data out through the public proxy 510. The public proxy 510 is the end of one domain and when the packet leaves the public proxy 510, the packet is eventually transmitted across the Internet to a target destination. Upon receiving the MTLS data from the public proxy 510, the egress secure gateways 516 determines the data is intended for another software service of the same entity 104 that sent the incoming packet 522 and encapsulates the MTLS data with new IP, TCP, and TLS session headers to create outgoing packet 524, as described in FIG. 3A. The system may run a TCP proxy that maintains session information, i.e., for all these packets going to a particular destination, the TCP proxy will track the session information and add additional headers to maintain the session to the destination.

The system 500 does away with use of a white list. In the conventional systems, an ingress gateway would check the white list after the CP NLB 502. Previously, conventional systems maintained an explicit white (allow) list of which source IP addresses are allowed to communicate to the IP address of the destination, which has huge scaling problems from an accuracy perspective and each cloud provider only provides the entity with a finite amount of implementation rules so the ability to add new IP addresses. In contrast, system 500 only sets up the TSL tunnel from egress to ingress from one domain of the entity to another, not to some other random destination. Consequently, setting up an authenticated TLS tunnel acts as an implicit white list. The disclosed embodiments thus move away from using explicit white list and rather than using the source IP address as the identity, the disclosed embodiments only look for the identity for validation in the packet itself. Therefore, there is no longer a need to maintain explicit allowance of these paths. Instead, the ingress logic expects a packet and makes a decision whether to reject or accept the packet based on the content in the packet and the validation logically run against the contents.

Figure 6:
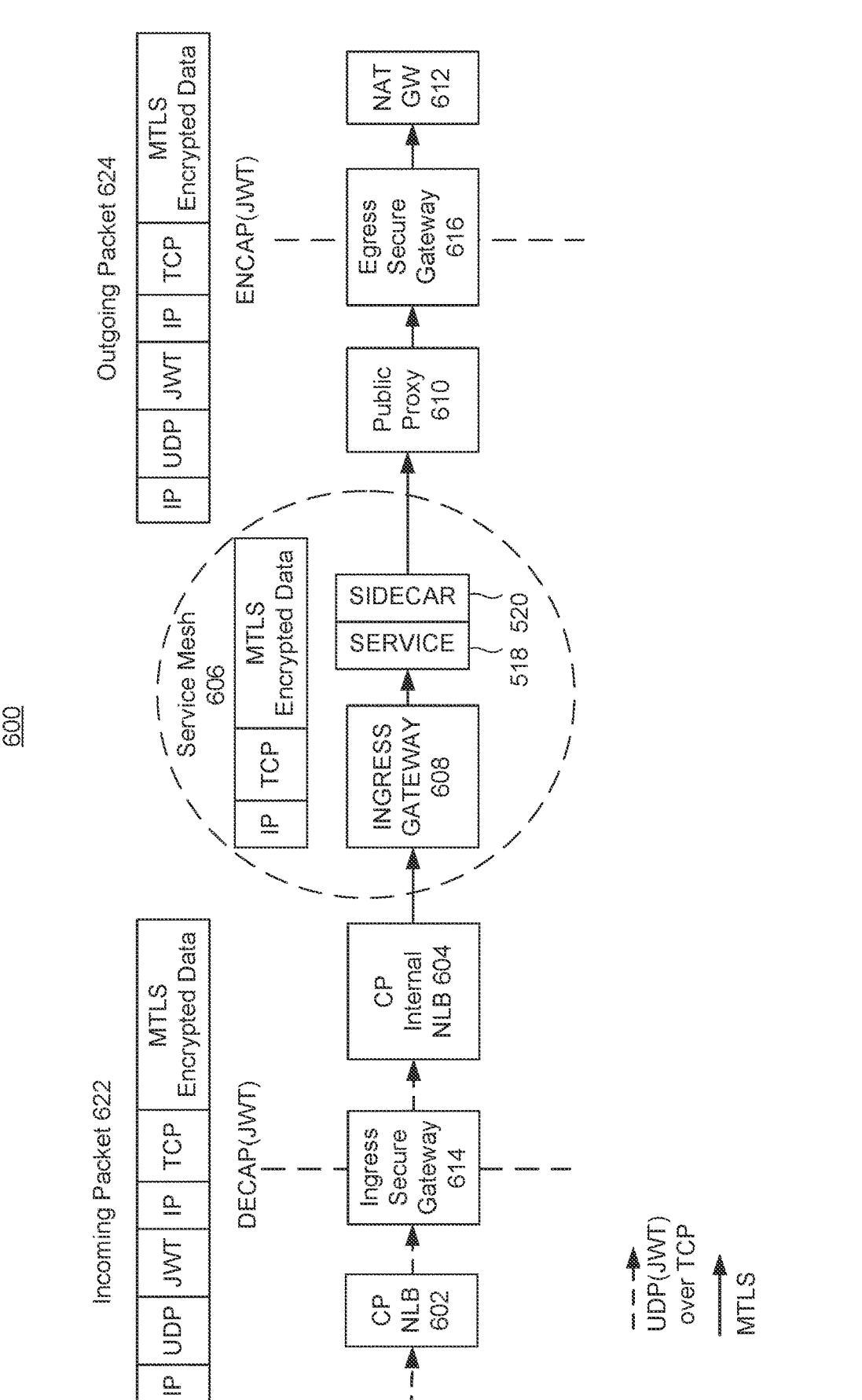
FIG. 6 illustrate an example system for extending the trust boundary between cloud domains of the same entity using UDP header and an additional JSON web token for inter-CD traffic according to the second implementation.

FIG. 6 illustrate an example system for extending the trust boundary between cloud domains of the same entity using UDP header and an additional JSON web token for inter-CD traffic according to the second implementation. The system 600 for the second implementation includes the component configuration as the first implementation, but the processing is different.

In the second implementation, a TCP incoming packet 622 packaged in UDP header and an additional JSON web token identifying the source domain/entity is received by the ingress secure gateway 614 from the CP NLB 602. The ingress secure gateway 614 receives the packet 622, performs validation, as described in FIG. 4B, decapsulates the IP header, the UDP header and the JWT, and sends the MTLS encrypted data to the service mesh 606 through the CP internal NLB 604.

The service mesh 606 processes the MTLS data and sends the MTLS data out through the public proxy 610. The public proxy 610 is the end of one domain and when the packet leaves the public proxy 610, and the packet is eventually transmitted across the Internet to a target destination. Upon receiving the MTLS data from the public proxy 610, the egress secure gateway 616 determines the data is intended for another software service of the same entity 104 that sent the incoming packet 622 and encapsulates the MTLS data with new IP header, UDP header and a JWT to create outgoing packet 624.

As an example of systems 500 and 600, assume there is a service in domain 1 the need to send an email using an email sender service in domain 2. The service in domain 1 will forward the email in a packet. The packet on the way out of domain 1 will get security information embedded in it, because the system trusts inherently anything running in domain 1. As the packet egresses domain 1, authentication information is added to the packet that indicates the source, and the authentication information is a certificate (encap (TLS) FIG. 5), or a one-time token (encap(JWT) FIG. 6) for validation. Then, the packet is transmitted. At the ingress at domain 2, the ingress logic captures that packet and runs validation on the packet, checks and validates the certificate or token, validates and lets the packet continue on to the email service. If the certificate or token doesn't validate, the system rejects the packet. Once the packet reaches the destination email service, the ingress security gateway decapsulates the external packet, examines the embedded certificate (TLS) or token (JWT), and allows the internal packet to proceed if validated.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
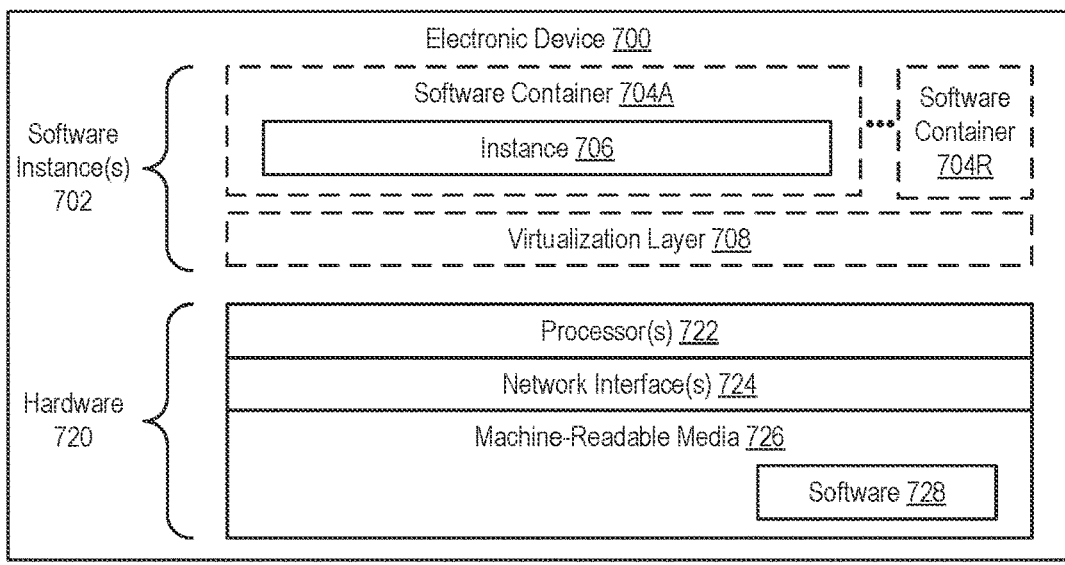
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients and the network protocol for extending a trust boundary between cloud domains of the same entity may be implemented in one or more electronic devices 700. In one implementation: 1) each of the clients is implemented in a separate one of the electronic devices 700 (e.g., in end user devices where the software 728 represents the software to implement clients to interface directly and/or indirectly with the network protocol for extending a trust boundary between cloud domains of the same entity (e.g., software 728 represents a web browser, a native client, a portal, a command-line interface, and/or an application programming interface (API) based upon protocols such as Simple Object Access Protocol (SOAP), Representational State Transfer (REST), etc.)); 2) the network protocol for extending a trust boundary between cloud domains of the same entity is implemented in a separate set of one or more of the electronic devices 700 (e.g., a set of one or more server devices where the software 728 represents the software to implement the network protocol for extending a trust boundary between cloud domains of the same entity); and 3) in operation, the electronic devices implementing the clients and the network protocol for extending a trust boundary between cloud domains of the same entity would be communicatively coupled (e.g., by a network) and would establish between them (or through one or more other layers and/or or other services) connections for submitting configuration data to the network protocol for extending a trust boundary between cloud domains of the same entity and returning a software package to the clients. Other configurations of electronic devices may be used in other implementations (e.g., an implementation in which the client and the network protocol for extending a trust boundary between cloud domains of the same entity are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor (s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

EXAMPLE ENVIRONMENT

Figure 7B:
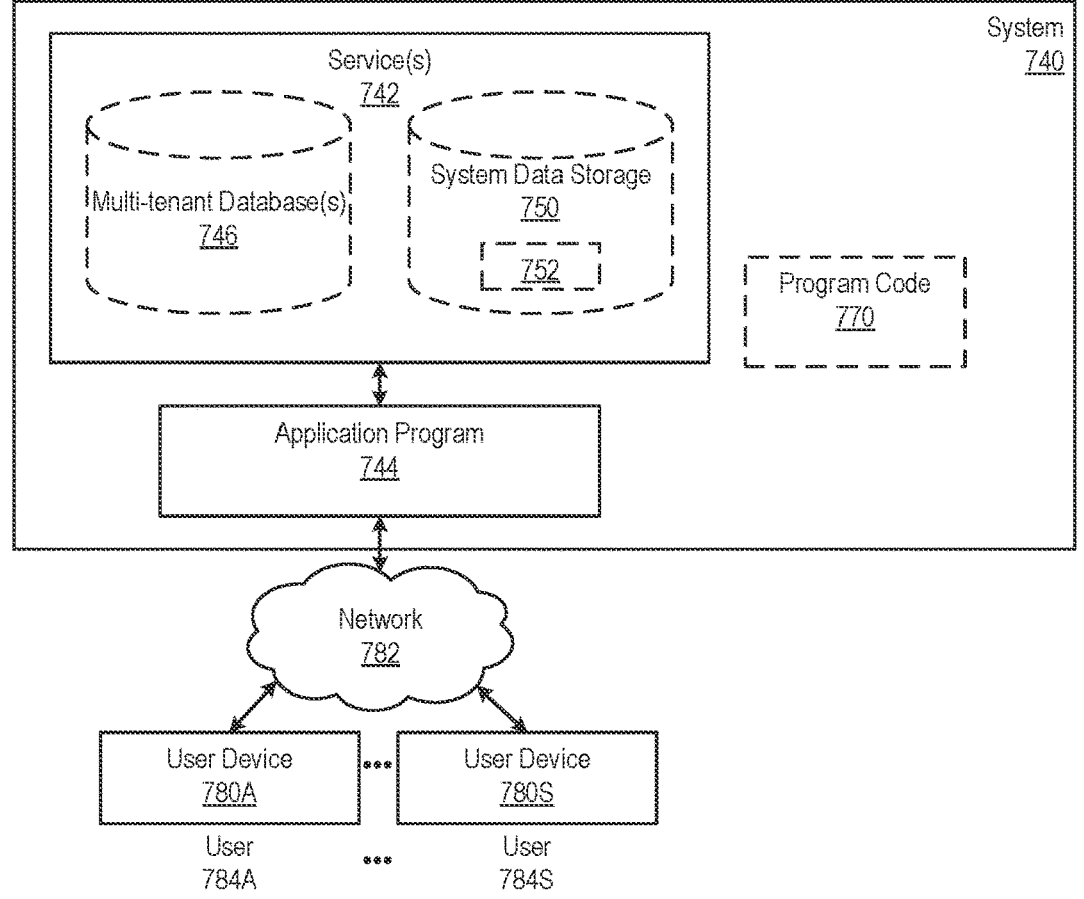
FIG. 7B is a block diagram of a deployment environment according to some example implementations.

FIG. 7B is a block diagram of a deployment environment according to some example implementations. A system 740 includes hardware (e.g., a set of one or more server devices) and software to provide service(s) 742, including the network protocol for extending a trust boundary between cloud domains of the same entity. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: Self-Healing Build Pipeline service 742; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the network protocol for extending a trust boundary between cloud domains of the same entity, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dotdash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method comprising:
   intercepting, by one or more computing devices at a target cloud domain of an entity, a packet from a source cloud domain received from a public network, wherein the packet includes an implicit certificate having authentication information indicating the cloud domain source of the packet, the authentication information having been added to the packet by egress logic associated with the source cloud domain;
   determining, by the one or more computing devices at the target cloud domain, whether the source cloud domain resides within the entity;
   in response to determining that the source cloud domain resides within the entity, automatically trusting the packet and forwarding the packet to a destination; and in response to determining that the source cloud domain resides outside the entity:

extracting, by the one or more computing devices at the target cloud domain, the authentication information from the intercepted packet;

validating, by the one or more computing devices at the target cloud domain, the intercepted packet based on the authentication information; and allowing or rejecting, by the one or more computing devices at the target cloud domain, the packet to proceed to a destination responsive to a determination whether the source cloud domain is trusted.

2. The method of claim 1, further comprising implementing an identity-based policy by associating an identifier of the entity or the source cloud domain with the authentication information to identify the source of the packet.

3. The method of claim 2, further comprising enforcing the identity-based policy on a transfer of data packets from server to server within a cloud platform.

4. The method of claim 1, further comprising implementing the authentication information as an explicit token.

5. The method of claim 4, further comprising implementing the authentication information as a Transport Layer Security (TLS) session tunnel for the packet.

6. The method of claim 5, further comprising using, by the one or more computing devices, an Open Systems Interconnection (OSI) layer 7 tunnel to set up the TLS session tunnel and placing the authentication information in a Server Name Indication (SNI) header of the packet.

7. The method of claim 6, further comprising:

parsing, by the one or more computing devices, the SNI header to determine if the SNI header contains an identifier of a trusted entity, cloud domain or server; and responsive to the SNI header containing the identifier, decapsulating the SNI header from the packet, by the one or more computing devices, and forwarding an inner packet to a destination service.

8. The method of claim 4, further comprising: implementing the authentication information by encapsulating the packet with a User Datagram Protocol (UDP) header and a JSON Web Token (JWT).

9. The method of claim 8, further comprising inserting, by the one or more computing devices, the JWT into a UDP tunnel packet at a layer 3 network level.

10. The method of claim 9, further comprising validating the JWT, by the one or more computing devices, to determine if the sender is trusted; and responsive to the JWT being validated, stripping the UDP header and forwarding the packet to a destination service.

11. A non-transitory machine-readable storage medium that provides instructions that, if executed by a processor, are configurable to cause said processor to perform operations comprising:

intercepting, by one or more computing devices at a target cloud domain of an entity, a packet from a source cloud domain received from a public network, wherein the packet includes an implicit certificate having authentication information indicating the source cloud domain of the packet, the authentication information having been added to the packet by egress logic associated with the source cloud domain;

determining, by the one or more computing devices at the target cloud domain, whether the source cloud domain resides within the entity;

in response to determining that the source cloud domain resides within the entity, automatically trusting the packet and forwarding the packet to a destination; and in response to determining that the source cloud domain resides outside the entity:

extracting, by the one or more computing devices at the target cloud domain, the authentication information from the intercepted packet;

validating, by the one or more computing devices at the target cloud domain, the intercepted packet based on the authentication information; and allowing or rejecting, by the one or more computing devices at the target cloud domain, the packet to proceed to a destination responsive to a determination whether the source cloud domain is trusted.

12. The non-transitory machine-readable storage medium of claim 11, further comprising implementing an identity-based policy by associating an identifier of the entity or the source cloud domain with the authentication information to identify the source of the packet.

13. The non-transitory machine-readable storage medium of claim 12, further comprising enforcing the identity-based policy on a transfer of data packets from server to server within a cloud platform.

14. The non-transitory machine-readable storage medium of claim 11, further comprising implementing the authentication information as an explicit token.

15. The non-transitory machine-readable storage medium of claim 14, further comprising implementing the authentication information as a Transport Layer Security (TLS) session tunnel for the packet.

16. The non-transitory machine-readable storage medium of claim 15, further comprising using, by the one or more computing devices, an Open Systems Interconnection (OSI) layer 7 tunnel to set up the TLS session tunnel and placing the authentication information in a Server Name Indication (SNI) header of the packet.

17. The non-transitory machine-readable storage medium of claim 16, further comprising:

parsing, by the one or more computing devices, the SNI header to determine if the SNI header contains an identifier of a trusted entity, cloud domain or server; and responsive to the SNI header containing the identifier, decapsulating the SNI header from the packet, by the one or more computing devices, and forwarding an inner packet to a destination service.

18. The non-transitory machine-readable storage medium of claim 14, further comprising: implementing the authentication information by encapsulating the packet with a User Datagram Protocol (UDP) header and a JSON Web Token (JWT).

19. The non-transitory machine-readable storage medium of claim 18, further comprising inserting, by the one or more computing devices, the JWT into a UDP tunnel packet at a layer 3 network level.

20. The non-transitory machine-readable storage medium of claim 19, further comprising validating the token, by the one or more computing devices, to determine if the sender is trusted; and responsive to the token being validated, stripping the UDP header and forwarding the packet to a destination service.

21

21. An apparatus comprising:

a processor, a non-transitory machine-readable storage medium that provides instructions that, if executed by the processor, are configurable to cause the apparatus to perform operations comprising, intercepting, by one or more computing devices at a target cloud domain of an entity, a packet from a source cloud domain received from a public network, wherein the packet includes an implicit certificate having authentication information indicating the source cloud domain of the packet, the authentication information having been added to the packet by egress logic associated with the source cloud domain;

determining, by the one or more computing device at the target cloud domain, whether the source cloud domain resides within the entity;

in response to determining that the source cloud domain resides within the entity, automatically trusting the packet and forwarding the packet to a destination; and in response to determining that the source cloud domain resides outside the entity:

extracting, by the one or more computing devices at the target cloud domain, the authentication information from the intercepted packet;

validating, by the one or more computing devices at the target cloud domain, the intercepted packet based on the authentication information; and allowing or rejecting, by the one or more computing devices at the target cloud domain, the packet to proceed to a destination responsive to a determination whether the source cloud domain is trusted.

* * * * *